United States Patent
Standlee

(10) Patent No.: US 7,127,985 B2
(45) Date of Patent: Oct. 31, 2006

(54) METHOD AND APPARATUS FOR CREATING CONSUMER FRIENDLY HAY BALES

(76) Inventor: Michael G. Standlee, 1690 East 990 S., Eden, ID (US) 83325

( * ) Notice: Subject to any disclaimer, the term of this patent is extended or adjusted under 35 U.S.C. 154(b) by 62 days.

(21) Appl. No.: 10/857,736

(22) Filed: May 28, 2004

(65) Prior Publication Data

US 2005/0055996 A1    Mar. 17, 2005

Related U.S. Application Data

(60) Provisional application No. 60/502,777, filed on Sep. 11, 2003.

(51) Int. Cl.
*B65B 13/02* (2006.01)

(52) U.S. Cl. ............ 100/3; 100/7; 53/399; 53/529

(58) Field of Classification Search .......... 100/2, 100/3, 7, 35, 41, 179, 188 R; 53/567, 529, 53/582, 399; 414/24.5, 24.6, 111, 132
See application file for complete search history.

(56) References Cited

U.S. PATENT DOCUMENTS

| | | | |
|---|---|---|---|
| 642,099 A | 1/1900 | Faulkner | |
| 2,696,777 A | 12/1954 | Sutch | |
| 3,185,074 A * | 5/1965 | George et al. | 100/98 R |
| 3,492,132 A | 1/1970 | Partyka | 99/192 |
| 4,285,190 A | 8/1981 | Ermachkov et al. | 56/341 |
| 4,370,796 A * | 2/1983 | Wilson | 29/564.3 |
| 4,803,832 A | 2/1989 | Crawford | 56/341 |
| 4,813,616 A | 3/1989 | Hosel et al. | 241/36 |
| 5,175,981 A | 1/1993 | Gombos et al. | 53/502 |
| 5,226,359 A | 7/1993 | Rempe | 100/88 |
| 5,377,481 A | 1/1995 | Sibley et al. | 56/341 |
| 5,893,309 A | 4/1999 | Ast | 83/36 |
| 6,016,731 A | 1/2000 | Gombos et al. | 83/425.2 |
| 6,152,026 A | 11/2000 | Simpson | 100/7 R |
| 6,397,738 B1 * | 6/2002 | Brown, Jr. | 100/3 |
| 6,579,552 B1 | 6/2003 | Myhre et al. | 426/420 |
| 6,631,672 B1 | 10/2003 | Hierden | 100/3 |

OTHER PUBLICATIONS

Big Promise From Big Pack—Printed on Jan. 19, 2004—Two Pages www.farmersjournal.ie/2003/1227/farmmanagement/machin...
High Honor of the DLG—Printed on Nov. 4, 2003—Two Pages http://216.239.37.104/translate_c?hl=en&sl=de&u=http://www.kro...
Krone—Printed on Nov. 4, 2003—Two Pages http://www2.agritechnica.de/2003/en/agrt_detail.jsp=ADRNR=3719...
Agritechnica Innovations—Printed on Nov. 6, 2003—Four Pages http://www2.agritechnica.de/2003/en/agrt_neubeiten.jsp.
Krone Big Balers—Big Pack VFS—22 Pages.

* cited by examiner

*Primary Examiner*—Derris H. Banks
*Assistant Examiner*—Jimmy T. Nguyen
(74) *Attorney, Agent, or Firm*—Stephen M. Nipper; Dykas, Shaver & Nipper, LLP

(57) ABSTRACT

A method and apparatus for providing easy to be handled, convenient, partially sized bales of hay, fastened together to form a single, "full-size" bale of hay. These partially sized bales made by a baler and then combined together via a bale aggregator.

3 Claims, 6 Drawing Sheets

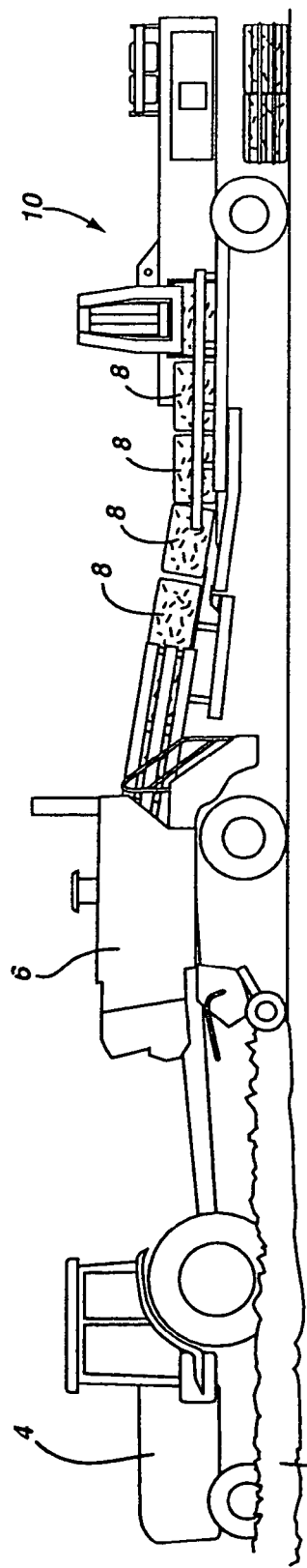
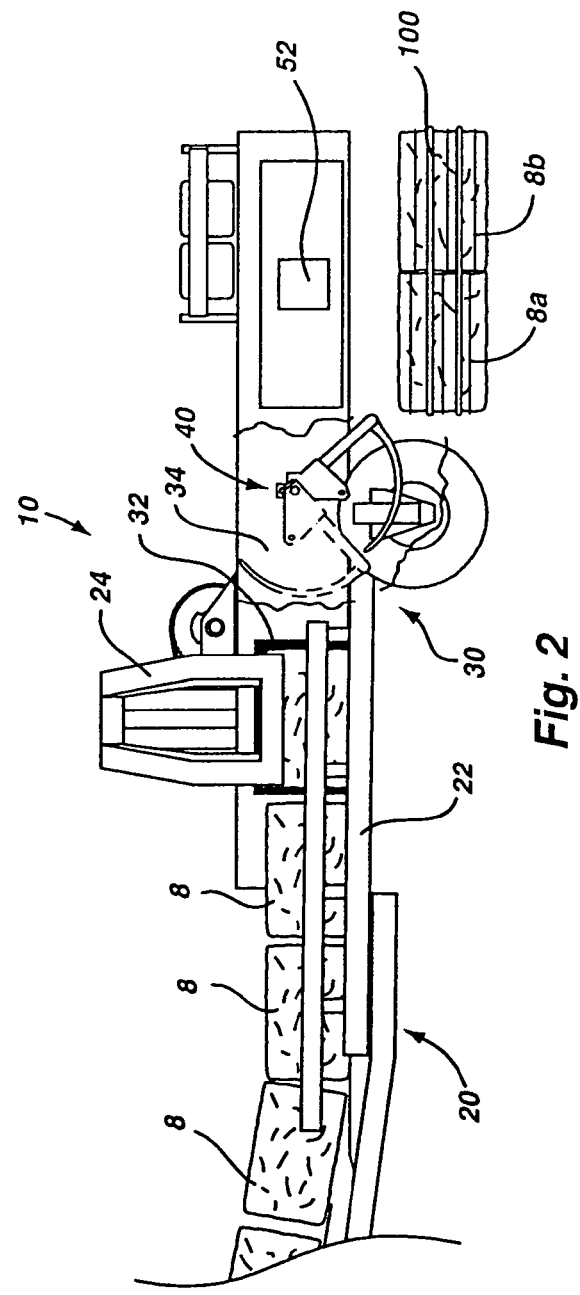
Fig. 1
Fig. 2

METHOD AND APPARATUS FOR CREATING CONSUMER FRIENDLY HAY BALES

PRIORITY

This application claims the priority date of the provisional application entitled "Method and Apparatus for Creating Consumer Friendly Hay Bales," filed by Michael Standlee on Sep. 11, 2003, with Ser. No. 60/502,777, the disclosure of which is incorporated herein by reference.

BACKGROUND OF THE INVENTION

Field of the Invention

The present invention generally relates to methods and apparatuses for the compression of fibrous materials, and more particularly relates to methods and apparatuses for baling hay, namely baling hay into easily divisible portions.

For purposes of this disclosure, the term "hay" will be used in a generic sense to describe cut foliage, particularly normal hay, such as that made from alfalfa, grasses used as feed, and straw. Also, while this invention is ideally used to bale "hay," said generic term is intended to include any material that may be baled using the invented method, including, but not limited to cotton, cardboard, etc.

In the United States, the baling of hay is typically done in size, format, and orientation that are convenient to a typical rancher, farmer, or dairyman. There are two standard bale sizes, namely an 18"×36"×14" bale (often referred to as a "two-string bale") and a 24"×46–48"×15–16"bale (often referred to as a "three-string bale"). These bales, depending on size, material, and moisture, can average 60 to 110 lbs. (two-string) and 90 to 140 lbs. (three-string).

A vast majority of these bales are handled by farmers, ranchers, dairymen, and the like through use of machinery and via physical labor. While this is the norm, there are many other individuals who purchase and handle bales of hay. For example, a horse owner may purchase hay bales in limited quantities to feed to his/her horses. Such an individual buying (at a feed store or farm store) only what he/she can conveniently haul (typically in the back of a pick-up truck or sports utility vehicle) and store. To such a user, lifting a 60 to 140 pound bale of hay into and out of a vehicle, along with maneuvering the hay bale to and from its storage location and to the feeding location, can be quite a chore. To some, it is an impossible task requiring them to break the bale (cutting the string(s)) into smaller portions. This action resulting in waste and mess.

What is needed is a manner of making the handling of hay more convenient for a consumer. The present invention solves this need.

SUMMARY OF THE INVENTION

The preferred embodiment of the present invention is a method and apparatus covering the concept of setting a standard hay baler to produce, rather than the standard 46–48 inch hay bales, 23–25 inch hay bales. Other lengths are obviously also possible. These approximately 24-inch hay bales then being further processed by the same piece of machinery or another piece of machinery in pairs and then tied together with baling twine or straps to form a single, roughly 47-inch hay bale comprising two separately tied hay bales. This aggregate or combination bale having an end length generally equal to a "full sized three-string" bale (46–48 inch hay bale). Because it conforms with the "standard" sized hay bale, standard hay handling equipment can be used for retrieving the invented combination hay bale from the field and likewise, standard hay handling equipment can be used during the storage and handling of said hay bale. The present invention comprising said method as well as various embodiments of apparatuses utilized to accomplish this function.

While the preferred embodiment is configured with respect to a three-string bale of a 46–48 inch length, obviously such disclosure and discussion is intended to be only one specific example and bales of other construction, number of strings, type of strings/strapping/bindings, lengths, breaths, widths, etc., are also expressly envisioned to be part of this disclosure and are other embodiments of the present invention.

Further, the purpose of the Abstract of the Disclosure is to enable the United States Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measure by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

BRIEF DESCRIPTION OF THE DRAWINGS

FIG. 1 shows an environmental side elevational view of one embodiment of the present invention.

FIG. 2 shows a partial, close-up view of the embodiment of FIG. 1.

DESCRIPTION OF THE PREFERRED EMBODIMENTS

Figure 3:
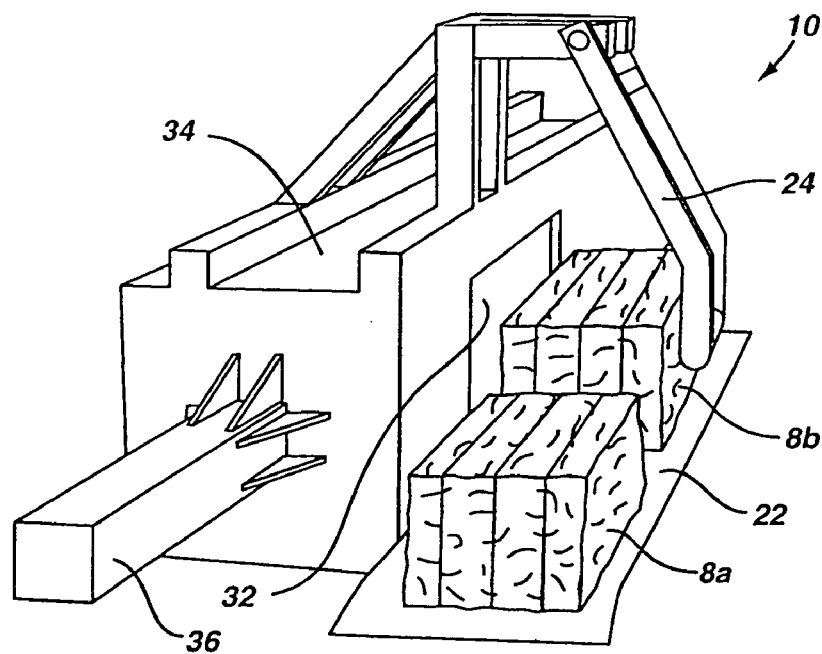
FIG. 3 shows a first end view, partial, of the embodiment of FIG. 1.

While the present invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Generally, the present invention is a method and apparatus for creating partial-sized bales of hay, and then joining two or more of these partial-sized bales together to form a single bale. Preferably, these bales of hay are "half-sized," being half the usual length thereby able to be joined together in pairs to form a "standard" full-length sized bale. The present invention could likewise be used to create any multiple of less than full sized bales, for instance, one-third size bales. The present invention's various embodiments include improvements to standard hay balers and/or conditioners as well as a new, separate standalone piece of agricultural machinery.

Referring initially to FIG. 1, shown is one embodiment of the present invention, namely a bale aggregator 10. This embodiment of bale aggregator 10 configured to be towed in series behind a standard hay baler 6 pulled by a tractor 4. This standard hay baler 6 configured to produce hay bales of a standard width and height, but only a partial (for instance ½) length. This combination pulled along a windrow 2, wherein hay in said windrow 2 is collected in the standard manner and processed within the hay baler 6 into a number of partial length hay bales 8. These partial length hay bales 8 transported to the bale aggregator 10 via (in this embodiment) a conveyor belt. These hay bales paired up within the bale aggregator 10 and tied (strapped or otherwise affixed together) to form a combination bale 100 comprising one or more hay bales joined together, preferably of a standard bale length.

The baler 6 configured for baling hay into bales of a predetermined size. It is preferred that the baler bale these bales into bales that are roughly ½ the normal length of standard hay bales. In the preferred embodiment, these bales having a general measurement of 24"×23–24"×15–16". In such a manner, these special bales 8 are generally ½ the size of a standard three-string bale (24"×46–48"×15–16"). The bale aggregator 10 then further processes these bales 8 as discussed herein.

In an alternative embodiment (not shown), the bale aggregator could be directly towed behind the tractor and configured to pick hay bales resting upon the field surface. In another embodiment (not shown), the bale aggregator could be merely a function of the hay baler, the hay baler itself performing the joining of independent bales together. In yet another embodiment (not shown), the bale aggregator could be incorporated within other hay handling machinery, for instance hay wagons and stackers. Therefore, the present invention is not intended to be limited to the specific preferred embodiment shown in the drawings and discussed in detail herein.

Figure 4:
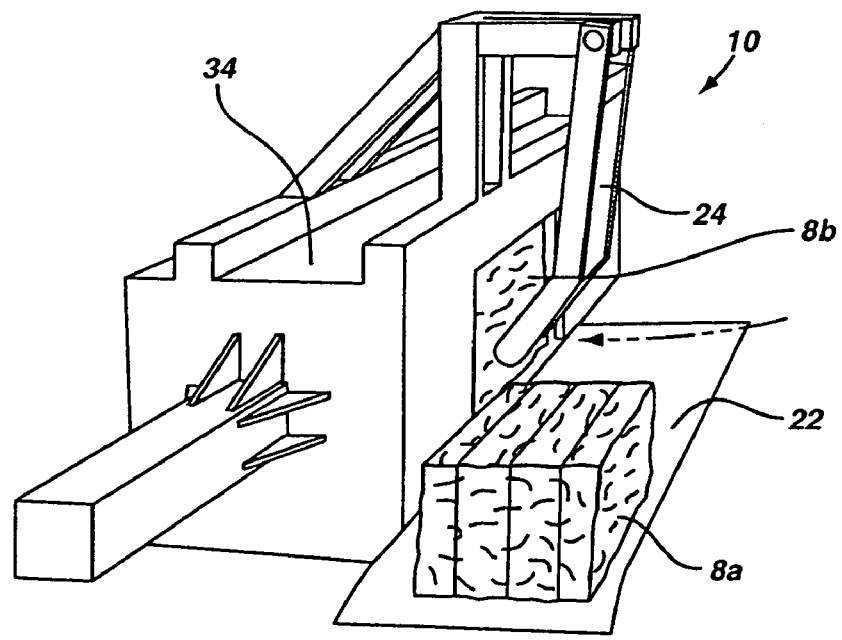
FIG. 4 shows a second end view, partial, of the embodiment of FIG. 1.

Referring now to FIGS. 2–4, shown is close up views of the embodiment of FIG. 1. These figures showing the bale aggregator 10 comprising a bale collector 20 for collecting bales 8, a bale compressor 30 for compressing together two or more bales (8a, 8b), a bale tier or strapper 40 for tying (or strapping) said bales together, and a bale ejector 50 for ejecting the joint/aggregated bale 100 out of the aggregator 10, preferably onto a ground (field) surface.

A bale collector 20 collects the hay bales 8. In the embodiment shown, the bale collector comprising a chute that collects bales, which were ejected in the standard manner from the hay baler 6. This chute having a conveyor belt 22 or other means for transporting the bales to the bale compressor 30. While this embodiment is shown directly collecting the hay bales coming out of the baler 6, it is expressly envisioned that the present invention could comprise a separately towed piece of farm equipment configured for travel through a field, this separate piece picking hay bales up off the ground surface, processing them (combining/aggregating them) and then returning them to the ground (or otherwise disposing of them).

The hay bales 8 (in FIGS. 3–4, bale 8a and bale 8b) are fed into the bale compressor 30 one at a time or in pairs (or other numerations), preferably through an entry door 32. A feed ram 24 (preferably hydraulic) or other device can be used to push the bales off the conveyor belt (or associated areas) and into the bale compressor 30, or other mechanisms can be used.

The bale compressor 30 comprising a compression chamber 34 in which the bales are compressed together in order to be tied. This compression is then released after the bales are tied together using the bale strapper 40. A compression ram 36 (preferably hydraulic) is used to compress the bales within the compression chamber 34 and to move bales within the compression chamber, as discussed infra. This compression ram 36 terminating in a compression ram head 38 configured for contacting, moving, and compressing against the hay bale(s).

The bales being "tied" together through use of standard baling tying methods and apparatuses, including but not limited to twine, wire, plastic strapping, plastic wrap, etc. While the term strapping is often used in this disclosure, such usage is not intended to be a limitation of how the bales are tied together. The preferred bale strapper comprising a standard bale knotter for applying twine straps to the bale(s).

Figure 11:
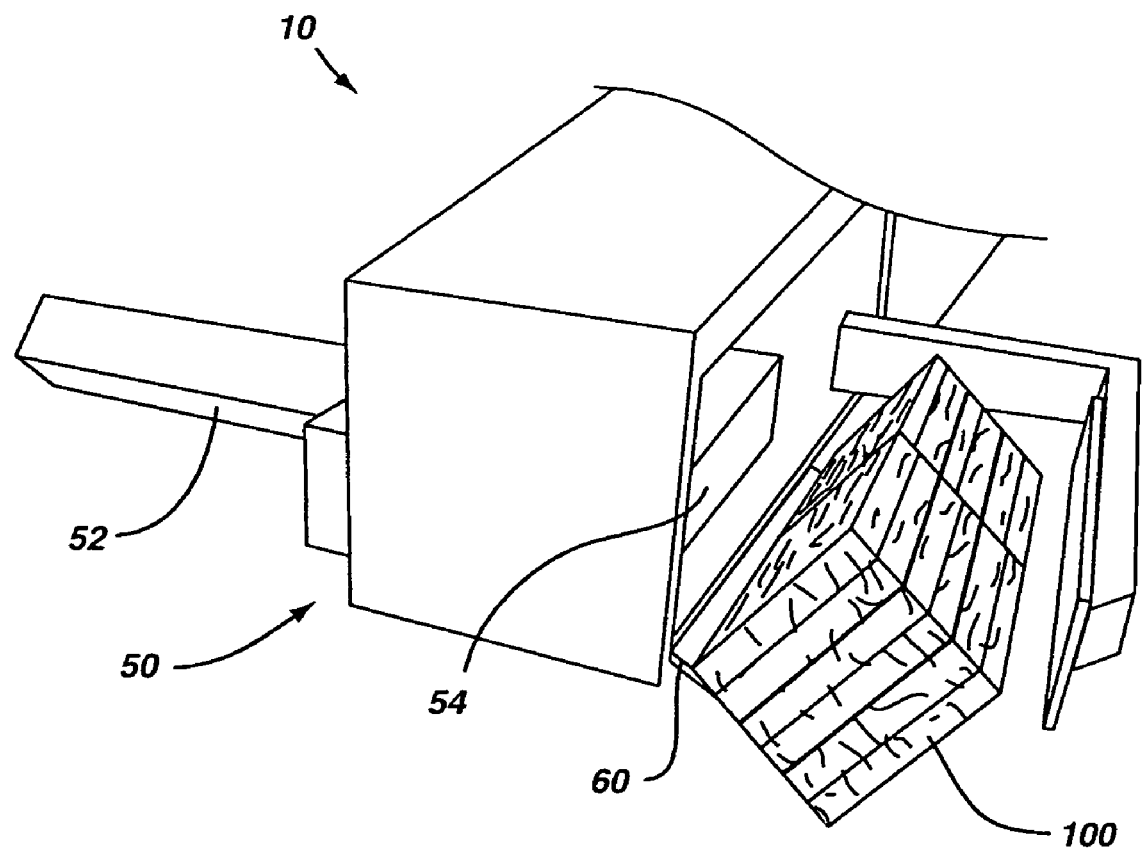
FIG. 11 is a partial, rear view of the embodiment of FIG. 1.

An aggregated bale 100 comprising a plurality of other bales (bale 8A and bale 8B for example) is then ejected out of the aggregator 10 (in this embodiment, however in other embodiments the aggregated bale after creation could be further handled as necessary). An ejection ram 52 is preferably used to eject the aggregated bale 100 out of the aggregator 10. As shown in FIG. 11, it is preferred that the aggregator 10 be configured so as to place the bale cut side down (string sides out) on the ground surface. Thus, the bales are preferably processed string side down, meaning that in embodiments that pick up bales (presumably cut side down), the bale will have to be rotated 90 degrees before processing. Of course, it is possible to process the bale otherwise (cut end down for instance), however such processing is less preferred due to the preference of using standard bale tying equipment (which generally is configured to tie the bales string side down).

FIGS. 5–10 show the preferred bale creation method and process. The figures show a plurality of bales 8, 8a, 8b, 28a, and 28b ready for aggregation, and bales in various steps within the process of aggregation (18a, 18b).

Figure 5:
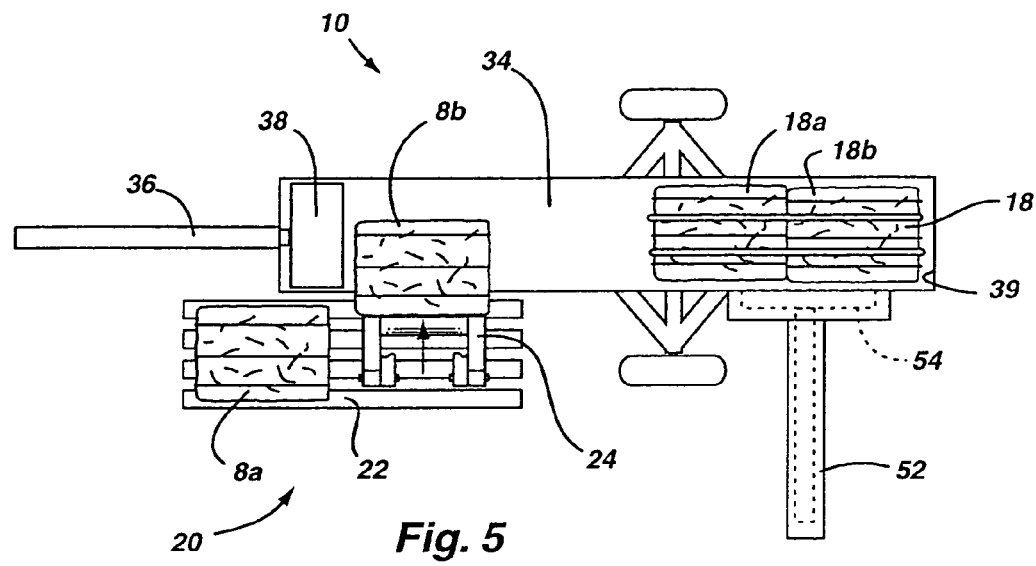
FIG. 5 is a first sequential plan view of a second embodiment of the present invention.

Referring initially to FIG. 5, an already aggregated bale 18 made up of a first bale 18a and a second bale 18b is shown within the compression chamber 34 as if the aggregator 10 was viewed already in use. The first bale 18a and the second bale 18b remaining separately baled (the strings/straps of 18a and 18b are not removed before baling together as an aggregate bale). This allows the aggregate bale to be later split back apart into the first bale 18a and the second bale 18b. This bale 18 already having been pushed to the rear of the compression chamber 34 by the ram 36/38, preferably against the rear or end wall 39. The feed ram 24 is used to feed the next bale 8*b* in the series into the compression chamber 34, this feed ram then retracted.

Figure 6:
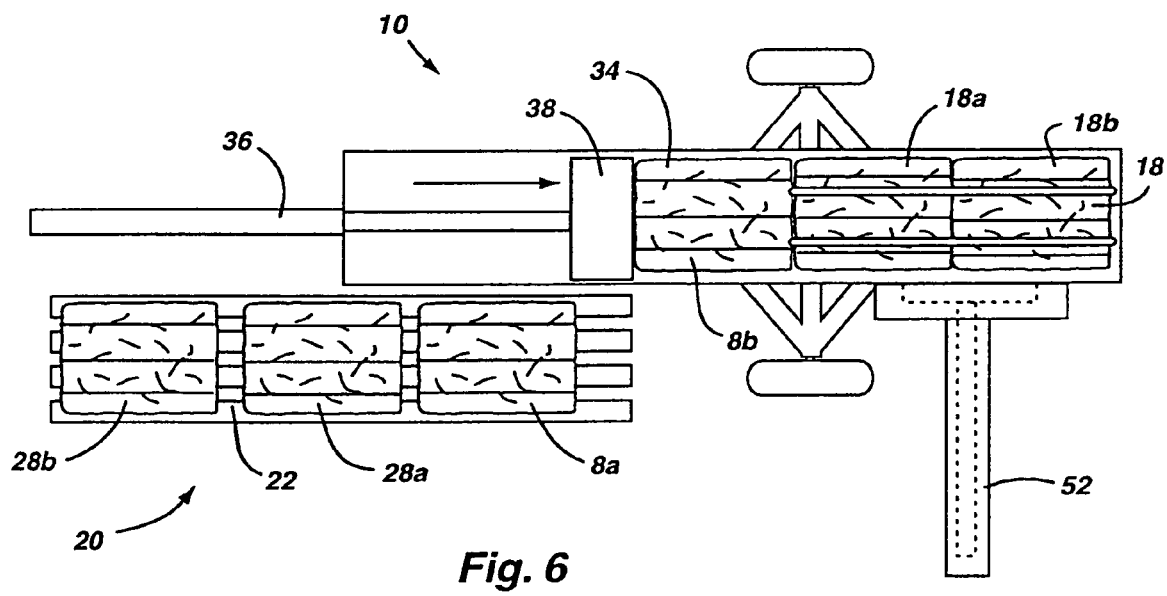
FIG. 6 is a second sequential plan view of the embodiment of FIG. 5.

Referring now to FIG. 6, this bale 8*b* is then pushed by the compression ram 36 and ram head 38 rearwards in the compression chamber 34, pushing the bale 8*b* against the front end of the initial bale 18 or against a stop (not shown). While in this embodiment the bales are compressed against the previously aggregated bale and this previously aggregated bale compressed against the rear wall 39 of the compression chamber, the present invention may include a separate compression plate or stop configured for placement within the compression chamber for providing a surface to compress the bales against or between. The ram/ram head is then retracted out of the compression chamber 34.

Figure 7:
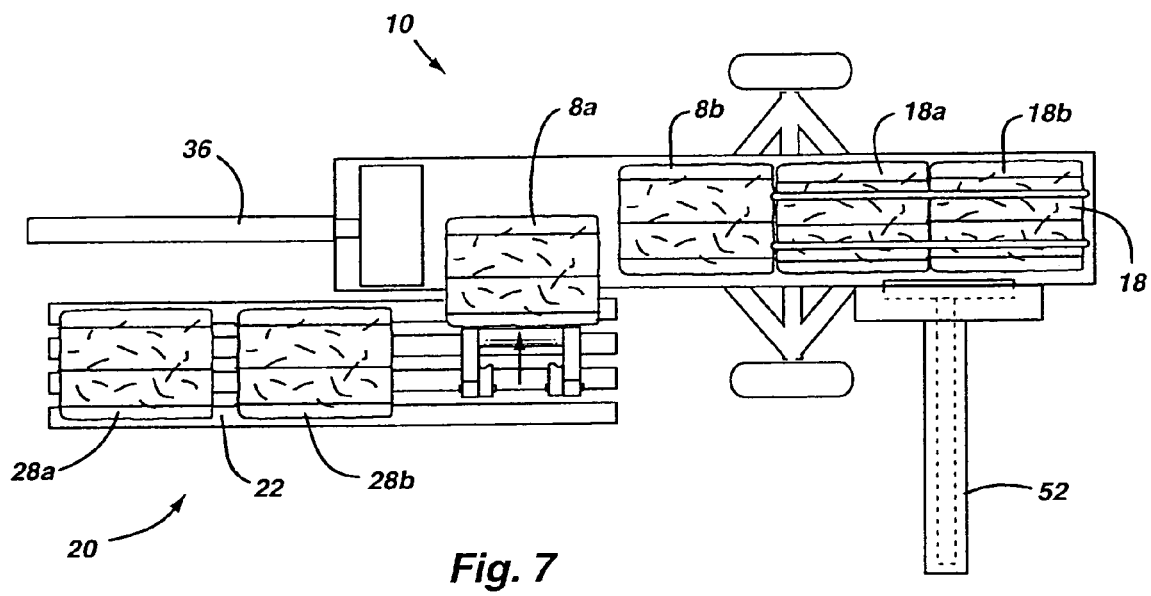
FIG. 7 is a third sequential plan view of the embodiment of FIG. 5.

Referring now to FIG. 7, the next bale 8*a* in the series is then fed into the compression chamber 34 through use of the feed ram 24, this feed ram subsequently retracted.

Figure 8:
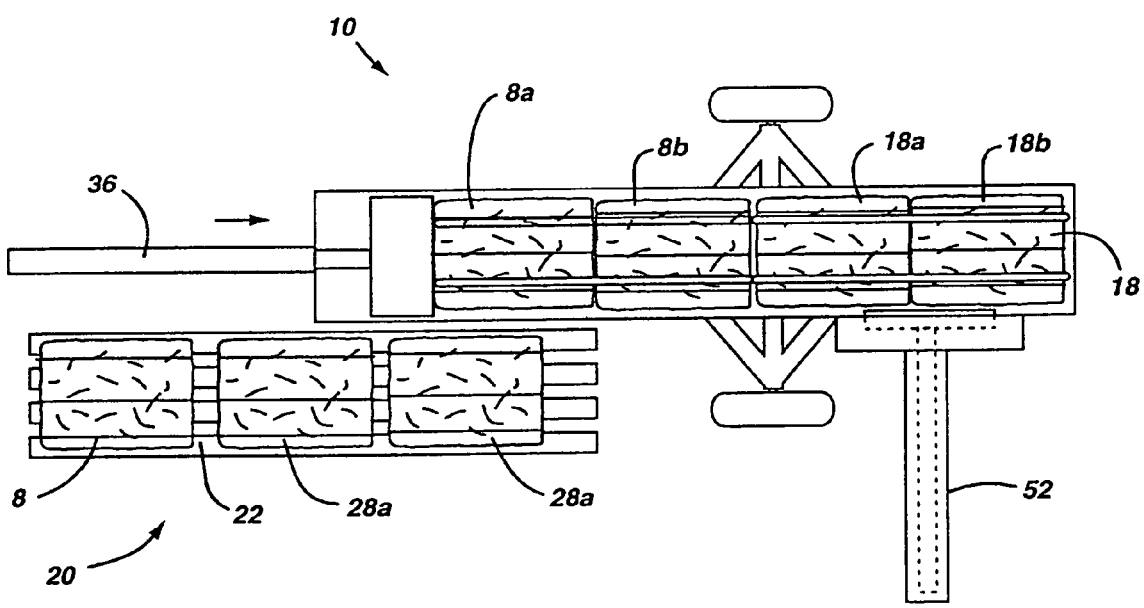
FIG. 8 is a fourth sequential plan view of the embodiment of FIG. 5.

Referring now to FIG. 8, the compression ram 36 and ram head 38 are then utilized to compress the bales 8*a* and 8*b* together. A bale strapper 40 is used to tie or strap the bales 8*a* and 8*b* together into an aggregated bale 100.

Figure 9:
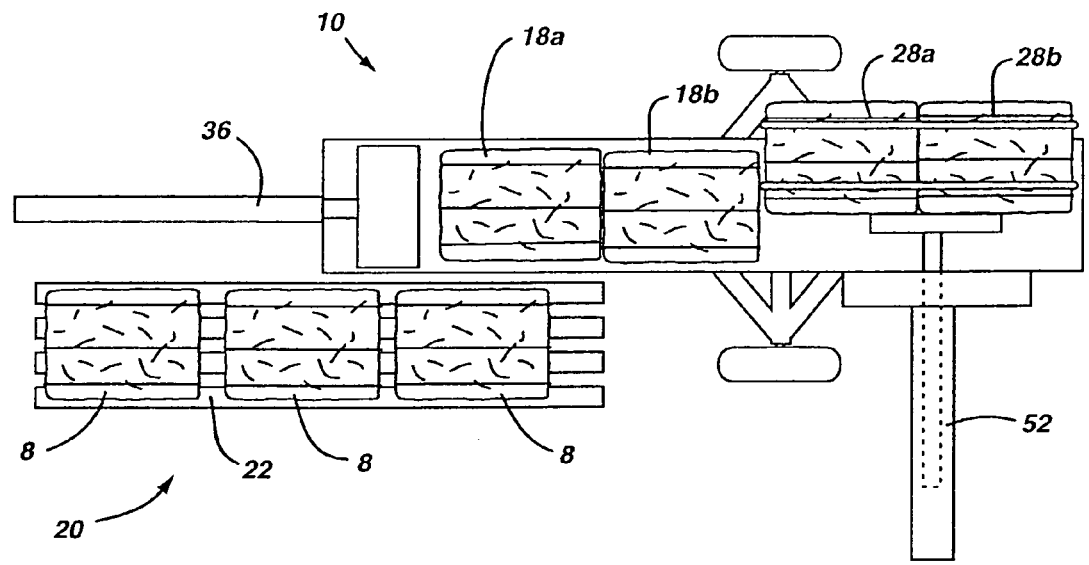
FIG. 9 is a fifth sequential plan view of the embodiment of FIG. 5.

Referring now to FIG. 9, after compression, the compression ram/head 36/38 is withdrawn and the initial compression bale 18 is ejected through use of the bale ejector 50 (ejection ram 52 and ram head 54) out onto the ground surface. The bale ejector is then withdrawn.

Figure 10:
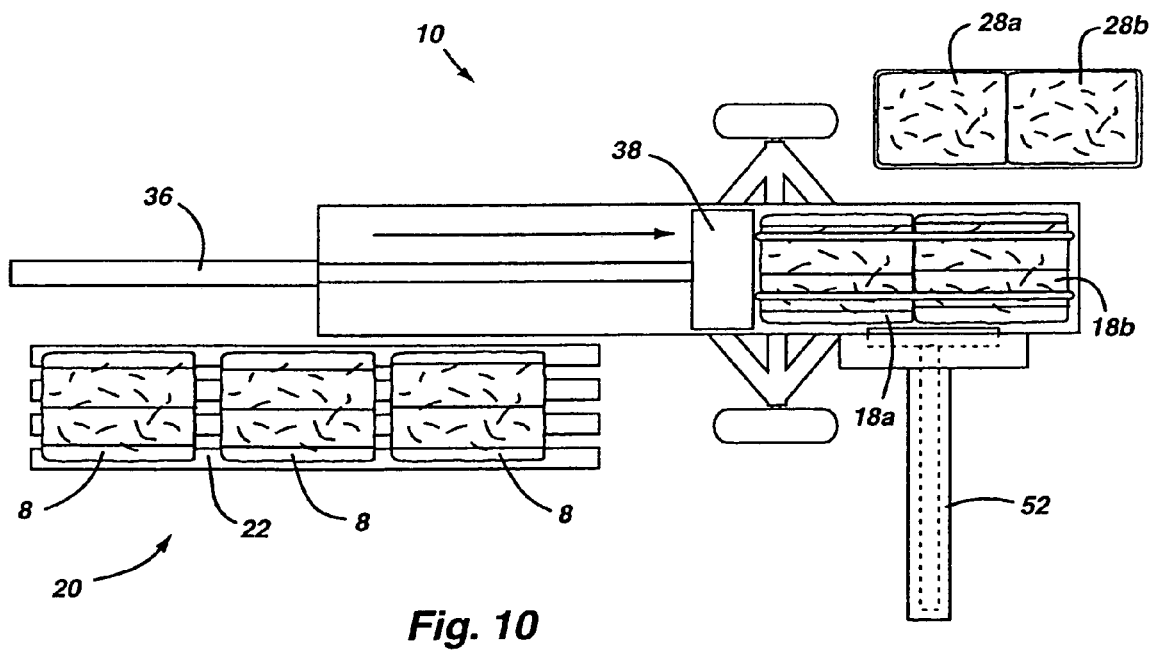
FIG. 10 is a sixth sequential plan view of the embodiment of FIG. 5.

Referring now to FIG. 10, the recently aggregate bale 100 is then pushed to the rear of the compression chamber by the compression ram 36 (which is subsequently withdrawn) and the process starts over as shown in FIGS. 5–10 with the next bales in the series (28*a*, 28*b*).

Referring finally to FIG. 11, shown is a view of an aggregate bale 100 being ejected from the bale aggregator 10 through use of the bale ejector 50 (ram 52, ram head 54). The aggregator 10 further comprising a pivoting platform 60 or other manner of causing the bale to be rotated so that it falls to the ground cut side down (string sides out). After the aggregate bale 100 is ejected onto the ground surface it can be retrieved from the ground surface through use of an automatic bale wagon, this automatic bale wagon thereby creating a haystack of the aggregate hay bales as automatic bale wagons typically do.

While this discussion of the present invention utilizes the present invention on hay, straw, cotton, and other fibrous material, it is specifically to be understood that the present invention could be applied to other fields of technology as well. Additionally, the present invention can be used with two-string bales, three-string bales, and any other sized bales.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A method of producing and handling aggregate hay bales, said method comprising the steps of:

collecting hay from a windrow into a baler;

baling said collected hay into generally rectangular parallelepiped bales, wherein each of said parallelepiped bales is generally one-half a length of a standard hay bale and each of said parallelepiped bales is individually held together using strings, said length of said standard hay bale is either 36 inches long or generally between 46 inches to 48 inches long;

collecting two of said generally half-length hay bales together in end-to-end fashion;

bailing and strapping said collected hay bales together without removing said strings to create an aggregate hay bale which is generally the length of said standard hay bale;

ejecting said aggregate hay bale onto a ground surface;

retrieving said aggregate hay bale from said ground surface through use of an automatic bale wagon;

using said automatic bale wagon to create a haystack of said aggregate hay bales.

2. The method of claim 1, wherein said parallelepiped bales each have a longitudinal axis, opposing strap sides, cut sides, a first end and a second end.

3. A method of producing and handling aggregate hay bales, said method comprising the steps of:

collecting hay from a windrow into a baler;

baling said collected hay into generally rectangular parallelepiped bales, which each of said parallelepiped bales is generally one-half a length of a standard hay bale, said parallelepiped bales each having a longitudinal axis, opposing strap sides, cut sides, a first end and a second end, each of said one-half length bales held together with straps along said opposing strap sides, said length of said standard hay bale is either 36 inches long or generally between 46 inches to 48 inches long;

collecting two of said parallelepiped hay bales together in an end-to-end fashion, thereby generally aligning the longitudinal axes of said parallelepiped bales;

bailing and strapping said collected hay bales together to create an aggregate hay bale which is generally the length of said standard hay bale, wherein said bailing and strapping step is performed without removing the straps of the collected hay bales;

ejecting said aggregate hay bale onto a ground surface;

retrieving said aggregate hay bale from said ground surface through use of an automatic bale wagon;

using said automatic bale wagon to create a haystack of said aggregate hay bales.

* * * * *